United States Patent
Pack (10) Patent No.: US 9,798,809 B2
(45) Date of Patent: *Oct. 24, 2017

(54) SYSTEM, METHOD, AND COMPUTER PROGRAM PRODUCT FOR CRAWLING A WEBSITE BASED ON A SCHEME OF THE WEBSITE

(71) Applicant: McAfee, Inc., Santa Clara, CA (US)

(72) Inventor: Gabriel Pack, Napa, CA (US)

(73) Assignee: McAfee, Inc., Santa Clara, CA (US)

( * ) Notice: Subject to any disclaimer, the term of this patent is extended or adjusted under 35 U.S.C. 154(b) by 58 days.

This patent is subject to a terminal disclaimer.

(21) Appl. No.: 14/296,563

(22) Filed: Jun. 5, 2014

(65) Prior Publication Data

US 2014/0351235 A1 Nov. 27, 2014

Related U.S. Application Data

(63) Continuation of application No. 12/171,128, filed on Jul. 10, 2008, now Pat. No. 8,756,213.

(51) Int. Cl.
*G06F 17/30* (2006.01)
*G06F 17/00* (2006.01)

(52) U.S. Cl.
CPC .. *G06F 17/30864* (2013.01); *G06F 17/30595* (2013.01)

(58) Field of Classification Search
CPC ........ G06Q 10/10; G06Q 30/02; G06Q 50/01; G06Q 30/018; G06Q 30/0625; G06Q 30/0207; G06Q 30/0251; G06Q 10/00; G06Q 30/0201; G06Q 20/40; G06Q 30/0255; G06Q 30/0279; G06Q 30/06; G06Q 40/12; G06Q 10/063112; G06Q 10/063114
See application file for complete search history.

(56) References Cited

U.S. PATENT DOCUMENTS

| | | | |
|---|---|---|---|
| 5,446,887 A | 8/1995 | Berkowitz | |
| 6,751,612 B1 | 6/2004 | Schuetze et al. | |
| 7,299,219 B2 | 11/2007 | Green et al. | |
| 7,559,016 B1* | 7/2009 | Rakowski | G06F 9/4445 715/204 |
| 7,769,742 B1 | 8/2010 | Brawer et al. | |
| 7,801,881 B1 | 9/2010 | Brawer et al. | |
| 2004/0064447 A1 | 4/2004 | Simske et al. | |
| 2005/0120006 A1 | 6/2005 | Nye | |
| 2006/0068755 A1 | 3/2006 | Shraim et al. | |
| 2006/0075494 A1* | 4/2006 | Bertman | G06F 21/552 726/22 |

(Continued)

OTHER PUBLICATIONS

Final Office Action Received for the U.S. Appl. No. 12/171,128, mailed on Dec. 21, 2011, 14 Pages.

(Continued)

*Primary Examiner* — Yicun Wu
(74) *Attorney, Agent, or Firm* — Blank Rome, LLP (57) ABSTRACT

A system, method, and computer program product are provided for crawling a website based on a scheme of the website. In use, a difference between a first content and second content of a website is identified. Additionally, a scheme of the website is identified based on the difference. Furthermore, the website is crawled based on the scheme.

20 Claims, 8 Drawing Sheets

(56) References Cited

U.S. PATENT DOCUMENTS

2010/0198804 A1  8/2010  Yaskin et al.

OTHER PUBLICATIONS

Final Office Action Received for the U.S. Appl. No. 12/171,128, mailed on Mar. 10, 2011, 14 Pages.
Final Office Action Received for the U.S. Appl. No. 12/171,128, mailed on Oct. 4, 2013, 19 Pages.
Non Final Office Action Received for the U.S. Appl. No. 12/171,128, mailed on Dec. 24, 2012, 16 Pages.
Non Final Office Action Received for the U.S. Appl. No. 12/171,128, mailed on Nov. 1, 2010, 11 Pages.
Non Final Office Action Received for the U.S. Appl. No. 12/171,128, mailed on Jun. 24, 2011, 12 Pages.
Notice of Allowance received for U.S. Appl. No. 12/171,128, mailed on Feb. 14, 2014, 7 Pages.

* cited by examiner

SYSTEM, METHOD, AND COMPUTER PROGRAM PRODUCT FOR CRAWLING A WEBSITE BASED ON A SCHEME OF THE WEBSITE

TECHNICAL FIELD

The present invention relates to gathering information associated with websites, and more particularly to crawling websites.

BACKGROUND ART

Traditionally, websites have been crawled for gathering information associated with such websites. Oftentimes, websites are crawled for identifying content of the websites, such as content that is vulnerable to unwanted activity (e.g. malware, etc.). However, conventional techniques for crawling websites have exhibited various limitations. Just by way of example, crawling entire websites has generally been time and resource intensive.

There is thus a need for addressing these and/or other issues associated with the prior art.

SUMMARY

A system, method, and computer program product are provided for crawling a website based on a scheme of the website. In use, a difference between a first content and second content of a website is identified. Additionally, a scheme of the website is identified based on the difference. Furthermore, the website is crawled based on the scheme.

DESCRIPTION OF EMBODIMENTS

Figure 1:
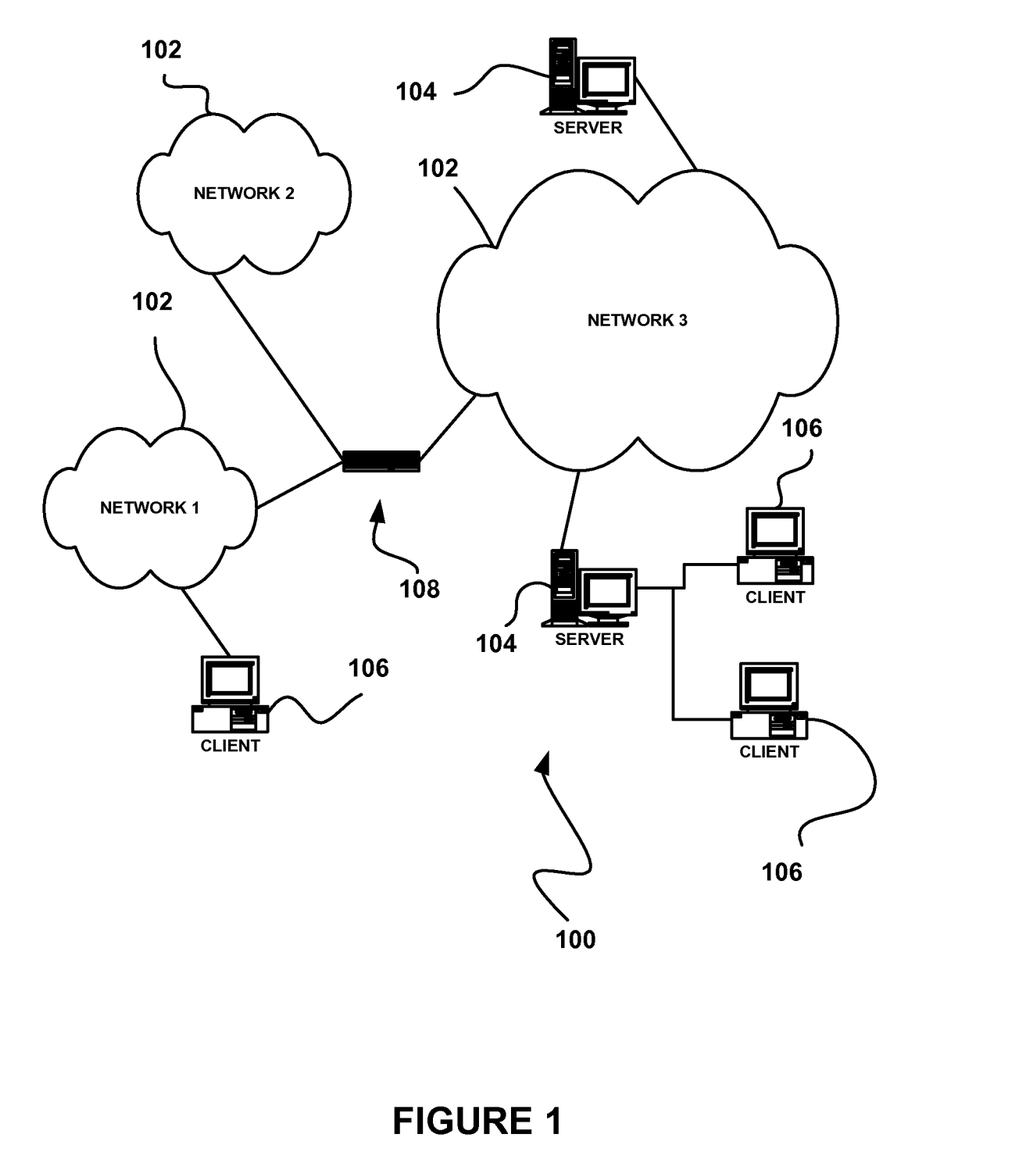
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
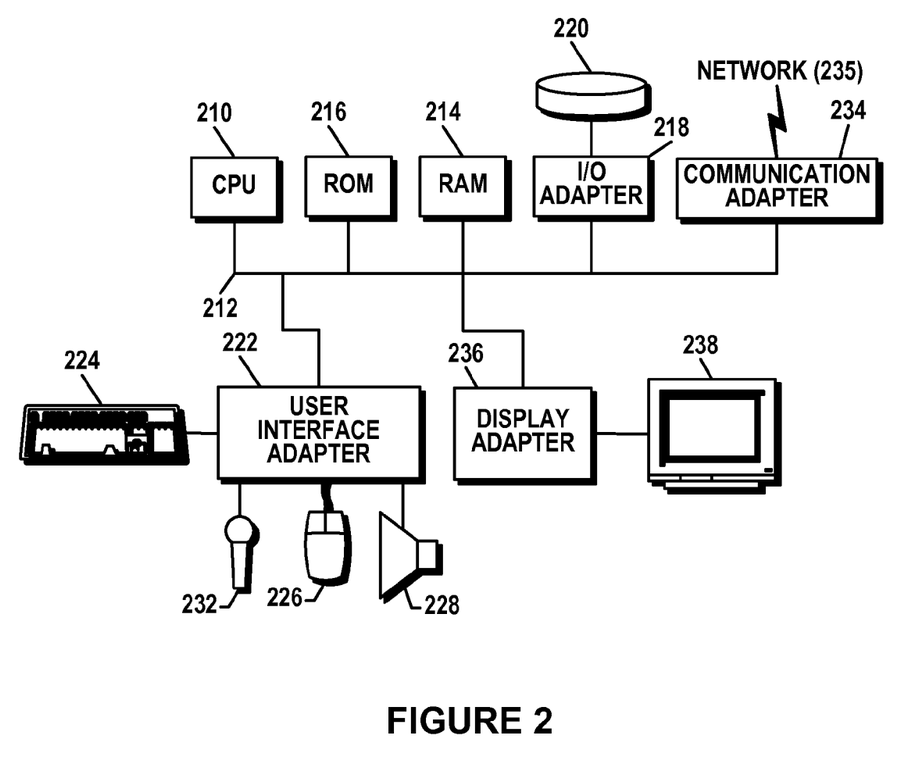
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
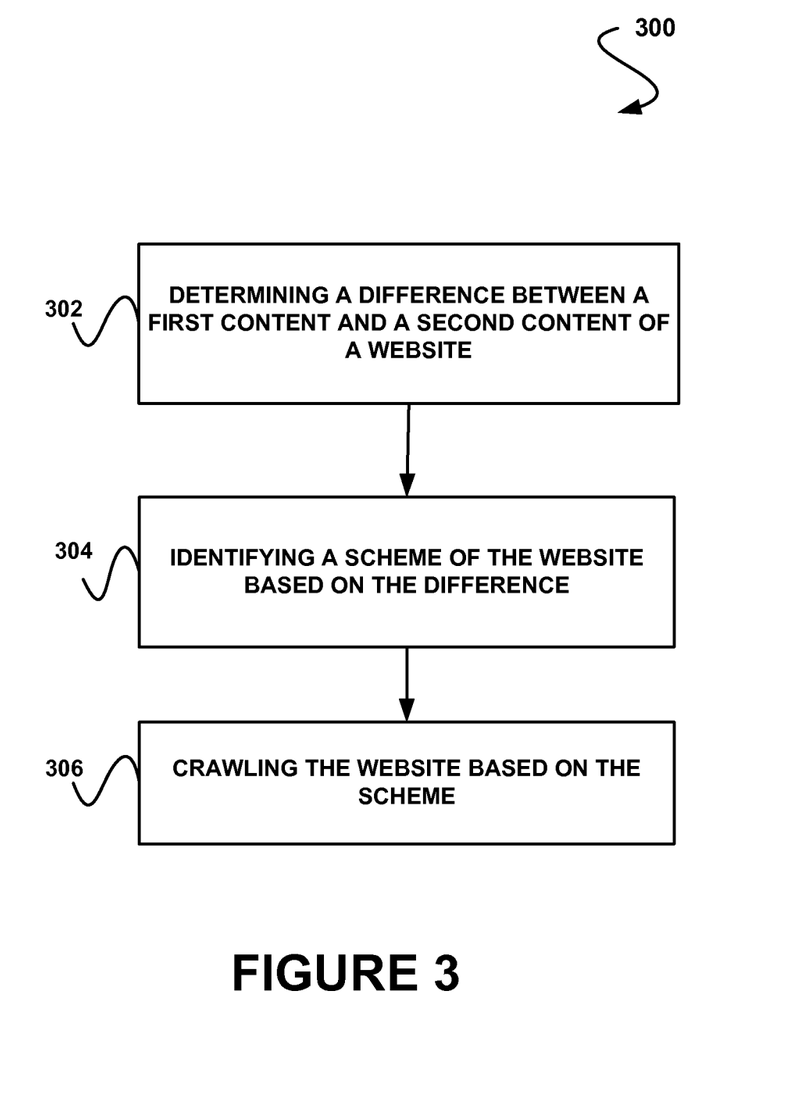
FIG. 3 shows a method for crawling a website based on a scheme of the website, in accordance with one embodiment.

FIG. 3 shows a method for crawling a website based on a scheme of the website, in accordance with one embodiment. As an option, the method 300 may be carried out in the context of the architecture and environment of FIGS. 1 and/or 2. Of course, however, the method 300 may be carried out in any desired environment.

As shown in operation 302, a difference between a first content and second content of a website is determined. With respect to the present description, the website may include any collection of content that is accessible via a network. For example, the website may include content stored on a server that is accessible via the Internet.

To this end, the first content and the second content of the website may include any content included in the collection of content accessible via the website. For example, the first content and the second content may include resources of the website. In various embodiments, the first content and the second content may include web pages, links, images, video, etc.

As an option, the first content and the second content may include responses to requests. As another option, the first content may include a first response to a first request and the second content may include a second response to a second request. Such requests may be issued to the website (e.g. via a security system), such that the responses may be received from the website. Just by way of example, the requests may be issued to locations predetermined to at least potentially be associated with the website, such as to directories common to websites, a root uniform resource locator (URL) of the website, etc. In one embodiment, the requests may include a hypertext transfer protocol (HTTP) request.

Additionally, the difference between the first content and the second content may be determined in any desired manner. In one embodiment, the first content and the second content may be compared for determining a difference between the first content and the second content. In another embodiment, the first response indicative of the first content and the second response indicative of the second content, as described above, may be compared for determining a difference between the first content and the second content. Optionally, the difference between the first content and the second content may be determined by comparing bits of the first content and the second content, bytes of the first content and the second content, etc.

In yet another embodiment, the difference between the first content and the second content may be determined by removing common sequences therebetween. As an option, the first content and the second content may be recursively bisected for removing the common sequences. For example, a largest common sequence between the first content and the second content may be removed from the first content and the second content, thus bisecting each of the first content and the second content into a first portion (e.g. a portion located before the removed sequence) and a second portion (e.g. a portion located after the removed sequence).

A largest common sequence among the first portion of the first content and a first portion of the second content may similarly be removed, as well as a largest common sequence among the second portion of the first content and the second portion of the second content, if such a common sequence exists. Removal of common sequences from the first content and the second content may be recursively performed in this manner, until it is determined that a common sequence does not exist for any of the portions of the first content and the second content. Such remaining portions of the first content and the second content may accordingly represent the difference between the first content and the second content.

As an option, the difference may be determined utilizing a b-tree (i.e. a binary tree). The b-tree may be utilized for recursively bisecting the first content and the second content to remove common sequences between such first content and second content, for example, as described above. For example, the nodes closest to the root of the b-tree may represent the largest common sequence between the first content and the second content, whereas the leaves of the b-tree (e.g. the nodes without children) may represent portions of the first content and the second content without common sequences therebetween.

As another option, the difference may be represented by a score (e.g. a difference score). In one embodiment, the score may be determined based on an amount of the difference. In another embodiment, an amount of different content (e.g. bits, etc.) included in the first content and the second content may be utilized for determining the score. Of course, however, the score may be determined in any desired manner.

Further, a scheme of the website is identified based on the difference, as shown in operation 304. With respect to the present description, the scheme may include any organization of the website. For example, the scheme may indicate an arrangement of content on the website.

In one embodiment, the scheme may identify locations in the website (e.g. web pages, etc.) in which different content is stored. Thus, if the difference between the first content and the second content is determined to be at least a predetermined amount (e.g. the score meets a threshold, etc.), the scheme may optionally be represented as the locations of the first content and the second content. As another option, if the difference between the first content and the second content is determined to be the greatest difference among a plurality of different content of the website, the scheme may optionally be represented as the locations of the first content and the second content.

In another embodiment, the scheme may identify requests capable of being utilized to retrieve different content of the website. For example, if the difference between the first content and the second content is determined to be at least a predetermined amount, the scheme may be represented by the first request utilized to retrieve the first content and the second request utilized to retrieve the second content. As another example, if the difference between the first content and the second content is determined to be the greatest difference among a plurality of different content of the website, the scheme may optionally be represented by the first request utilized to retrieve the first content and the second request utilized to retrieve the second content.

In yet another embodiment, the scheme may be identified by processing the first request, the second request, and a third request. The third request may include a request for content which has not necessarily been issued to the website, and thus for which third content has not been identified (e.g. a third response has not been received). For example, the third request may include a request that may be potentially issued to the website (e.g. that is capable of being made to the website). As an option, the third request may be selected from a plurality (e.g. pool) of requests that may be potentially issued to the website. Each of the plurality of requests may correspond to a resource reference associated with the website which has been identified by crawling the website, for example.

In one embodiment, the processing may take into account the difference between the first content and the second content. For example, the processing may include determining a difference between the first request and the second request. Such difference may include a structural difference of the first request and the second request, for example (e.g. a difference in a format, a difference in data making up the first request and the second request, etc.).

In another embodiment, the processing may include comparing the third request to each of the first request and the second request. Thus, the third request that may potentially be issued may be compared to the first request and the second request which have already been issued for which the first content and the second content were respectively identified. Comparing the third request to the first request and the second request may be performed for identifying a difference (e.g. a structural difference, etc.) between the third request and the first request and a difference between the third request and the second request. As an option, the processing may utilize a b-tree (e.g. for identifying the differences between each of the first request, the second request and the third request).

In a further embodiment, the processing of the first request, the second request and the third request may result in a first score. For example, the first score may represent a difference between the first request, the second request and the third request. Such difference may include a structural difference of the first request, the second request and the third request (e.g. difference structural locations of the first request, the second request and the third request, etc.), as an option.

As another example, the first score may represent a priority of the third request. The priority may indicate a priority in which the third request is to be utilized for crawling the website, in one embodiment. In another embodiment, the priority may account for the difference between the first content and the second content, the difference between the first request and the second request, and the difference between the first request and the third request, and the difference between the second request and the third request. To this end, the scheme may optionally be represented by the first score in association with the first request, the second request and the third request.

Moreover, the scheme may be further identified by processing the first request, the second request and a fourth request. The fourth request may be different from the third request. In addition, the fourth request may optionally be selected from the plurality of requests that may be potentially issued to the website.

In one embodiment, the processing of the first request, the second request and the fourth request may be performed in a similar manner as that described above with respect to the processing of the first request, the second request and the third request. Thus, the processing may optionally result in a second score. For example, the second score may represent a priority of the fourth request. Accordingly, the scheme may optionally be represented by the second score in association with the first request, the second request and the fourth request.

It should be noted the processing may be performed with respect to the first request and the second request for each of the requests that may be potentially issued to the website, such that a score may be determined for each of the requests that may be potentially issued to the website. For example, in an embodiment where the score indicates a priority of an associated request, the requests that may be potentially issued to the website may be ordered (e.g. in a queue, etc.) according to the priorities thereof. Further, the scheme may be represented by each of such scores.

In another embodiment, the scores (e.g. the first score and the second score) may be compared. For example, the scores may be compared for identifying a greatest score (e.g. a score indicating a greatest difference among a request that may potentially be issued, the first request and the second request). As an option, the scheme of the website may be represented by the request with the greatest score that may potentially be issued.

Still yet, as shown in operation 306, the website is crawled based on the scheme. With respect to the present description, crawling the website may include identifying information associated with the website, such as resources of the website, based on the scheme. For example, crawling the website may include retrieving the website resources for extracting further references to additional resources of the website.

In one embodiment, the website may be crawled by issuing a request representative of the scheme. Thus, if the scheme is represented by the request with the greatest score that may potentially be issued, the website may be crawled by issuing such request. To this end, the crawling may optionally result in a response to the request, such that information included in the response may be gathered via the crawling.

Just by way of example, the first score resulting from processing of the first request, the second request and the third request may be compared to the second score resulting from the first request, the second request and the fourth request. Additionally, only one of the third request and the fourth request may be transmitted (e.g. to the website) for crawling the website, based on the comparison. Optionally, if the second score is greater than the first score (e.g. indicating that the fourth request is of higher priority than the third request), the fourth request may be transmitted for crawling the website. As another option, if the first score is greater than the second score (e.g. indicating that the third request is of higher priority than the fourth request), the third request may be transmitted for crawling the website.

In this way, the website may be crawled utilizing a request determined to have a greatest difference with respect to prior issued requests associated with content (e.g. responses) of a greatest difference. For example, crawling the website based on the scheme may allow content with the greatest difference to be identified.

As an option, the website may be crawled utilizing a security system (e.g. a scanner). Such security system may include that utilized to identify the first content and the second content (e.g. by issuing the first request and the second request and receiving the respective first response and the second response). Accordingly, the website may be crawled for security purposes (e.g. for determining whether content of the website is vulnerable to unwanted activity, such as malware, etc.).

As another option, the resources utilized to identify the scheme of the website and crawl the website based on such scheme may be reduced in many different manners. In one embodiment, the difference between the first content and the second content, the first request and the second request, and/or the first request, the second request and any request that may potentially be made may be determined at a byte level (e.g. instead of a bit level), for reducing the amount of data for which the difference is determined.

In another embodiment, only subset of a full set of requests issued to the website and responses received based on such requests may be stored. For example, such requests and responses may be stored for use in determining a difference between each possible pair of responses to identify content of the website with a greatest difference, such that the scheme may be identifying based on the content with the greatest difference. As an option, a predetermined number of latest requests issued may be stored, along with the associated responses.

In yet another embodiment, only a fingerprint of each of the requests issued to the website and responses received based on such requests may be stored, such that an amount of memory utilized is reduced. Of course, as another option, each of the requests issued to the website and responses received based on such requests may be compressed for storage purposes.

In still yet another embodiment, each of the requests issued to the website and responses received based on such requests may be processed (e.g. for determining a difference therebetween, for determining a difference with a request that may be potentially issued to the website, etc.) utilizing multiple parallel threads. For example, a plurality of scores each indicating a priority of one of the requests that may potentially be issued to the website may be determined in parallel utilizing multiple parallel threads. If the website is to be crawled before a score for at least one of the requests that may potentially be issued to the website is determined, one of such requests that was the last request identified as being potentially capable of being issued to the website (e.g. the last request added to the plurality of requests that may potentially be issued to the website) may be utilized for crawling the website. For example, requests identified as being potentially capable of being issued to the website that were identified prior to the last request identified may be automatically determined to be devoid of having a greatest difference with respect to requests that have already been issued to the website (e.g. the first request and the second request described above).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
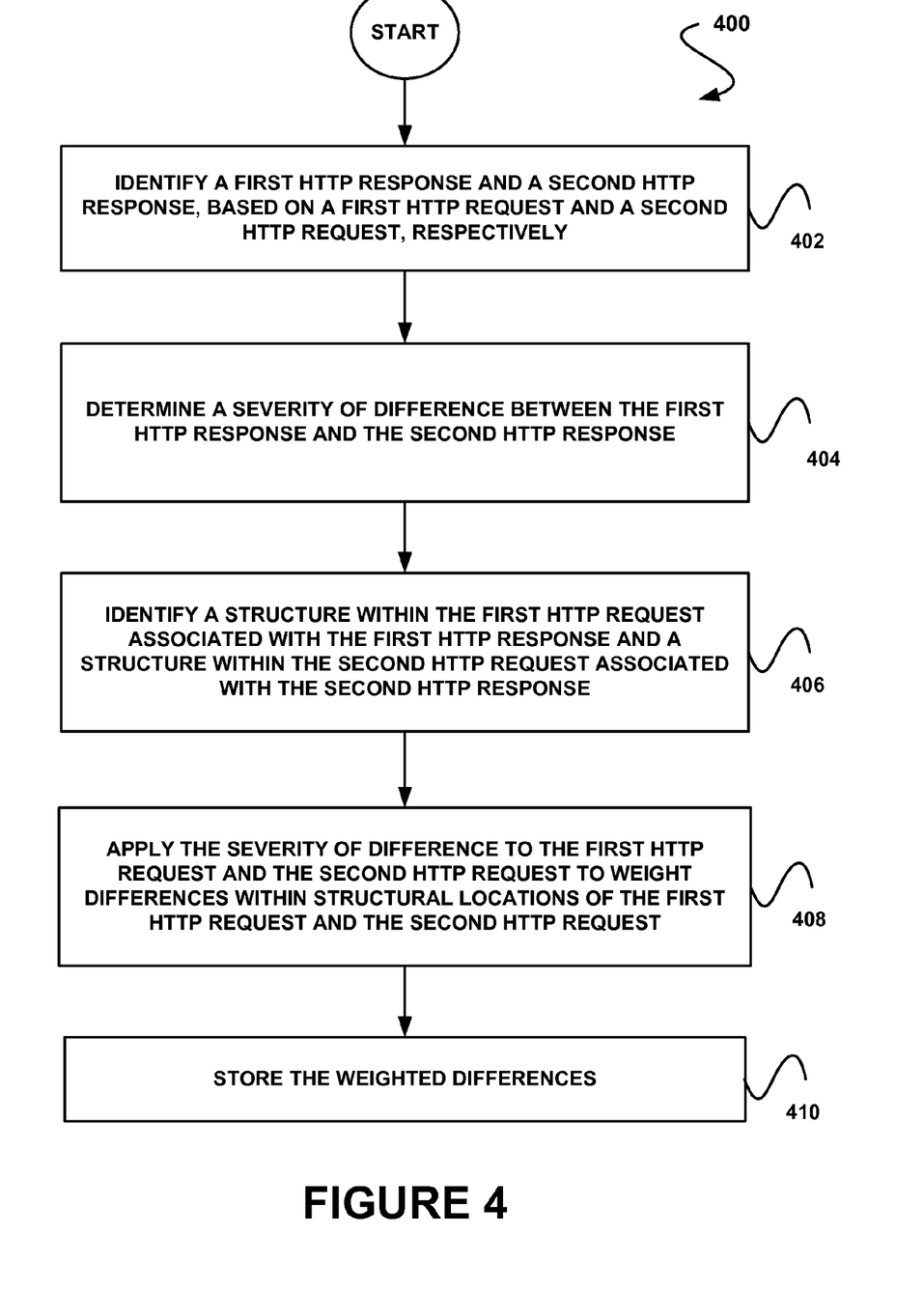
FIG. 4 shows a method for storing a weighted difference between structure locations of content requests, in accordance with another embodiment.

FIG. 4 shows a method 400 for storing a weighted difference between structure locations of content requests, in accordance with another embodiment. As an option, the method 400 may be carried out in the context of the architecture and environment of FIGS. 1-3. Of course, however, the method 400 may be carried out in any desired environment. It should also be noted that the aforementioned definitions may apply during the present description.

As shown in operation 402, a first HTTP response and a second HTTP response are identified, based on a first HTTP request and a second HTTP request, respectively. Thus, with respect to the present embodiment, the first HTTP request may include a request previously issued to a website, for which the first HTTP response has been received, and the second HTTP request may include a request previously issued to the website, for which the second HTTP response has been received. The first HTTP response and the second HTTP response may each reflect different content of the website retrieved utilizing the first HTTP request and the second HTTP request, respectively.

As an option, the first HTTP response and the second HTTP response may be stored (e.g. in a database, etc.). As another option, the first HTTP request may be stored in association with the first HTTP response, and the second HTTP request may be stored in association with the second HTTP response. Accordingly, the first HTTP response and a second HTTP response may be identified (e.g. at random, based on a time in which the responses were received, etc.) from the location in memory in which such responses are stored.

Additionally, as shown in operation 404, a severity of difference between the first HTTP response and the second HTTP response is determined. In one embodiment, the severity of difference may be represented by a score. For example, the score may reflect the severity of the difference between the first HTTP response and the second HTTP response.

Figure 7:
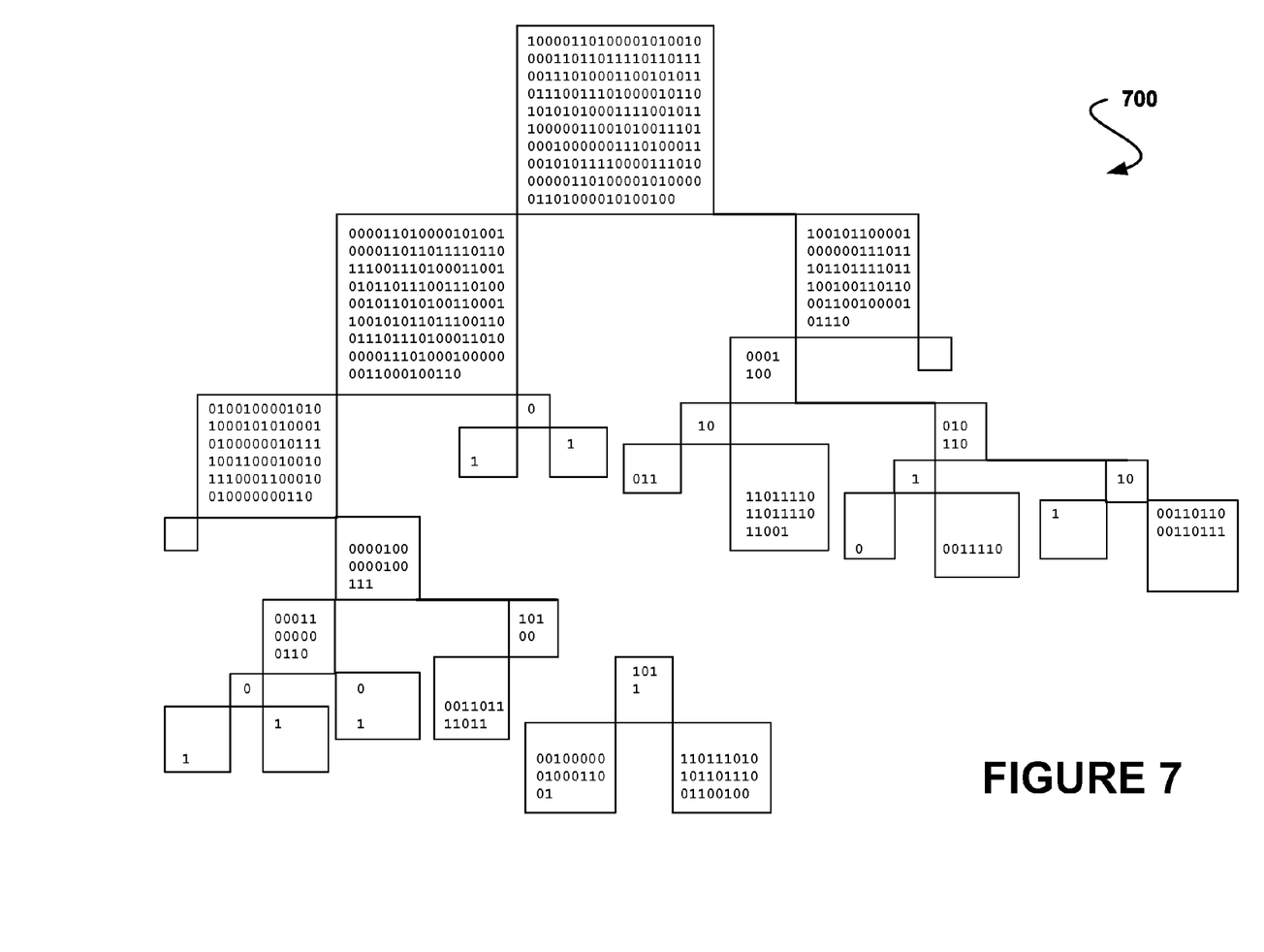
FIG. 7 shows a b-tree utilized for determining a difference between responses to content requests, in accordance with another embodiment.

As an option, the difference between the first HTTP response and the second HTTP response may be identified utilizing a b-tree (e.g. see FIG. 7). Of course, however, the difference may be identified in any desired manner. As another option, the score representative of the severity of the difference may be determined based on an amount of the difference (e.g. may reflect a number of bits that are different between the first HTTP response and the second HTTP response, etc.).

Furthermore, a structure within the first HTTP request associated with the first HTTP response and a structure within the second HTTP request associated with the second HTTP response is identified. Note operation 406. With respect to the present embodiment, the structure within the first HTTP request may include a portion of the first HTTP request and the structure within the second HTTP request may include a portion of the second HTTP request, where such portion of the first HTTP request and such portion of the second HTTP request are different.

In addition, the structure within the first HTTP request and the structure within the second HTTP request may include structures which are different from a structure of a third HTTP request which has not previously been issued to the website (e.g. for which a response has not been stored), but which is determined to be capable of potentially being issued to the website. In one embodiment, the portions may be identified as being different utilizing a b-tree (e.g. see FIG. 8).

As an option, the structure within the first HTTP request, the structure within the second HTTP request and the structure within the third HTTP request may only be identified if it is determined that the severity of the difference between the first HTTP response and the second HTTP response is a greatest severity of difference among a plurality of severity of differences determined for other pairs of HTTP responses associated with the website. For example, a severity of difference between each possible pairing of HTTP responses associated with the website may be determined, such that the HTTP responses with the greatest severity of difference may be determined and structures of the associated requests identified.

It should be noted that operation 406 may be performed for each HTTP request which has not previously been issued to the website, but which is determined to be capable of potentially being issued to the website. Thus, for each potentially issuable request, a structure within each of the first HTTP request, the second HTTP request and the potentially issuable request that is determined to be uncommon among such requests may be determined.

Still yet, the severity of difference is applied to the first HTTP request and the second HTTP request to weight differences within structural locations of the first HTTP request and the second HTTP request. Note operation 408. Weighting the differences may include determining a priority (e.g. priority score) for each of the HTTP requests (hereinafter potential HTTP request) which have not previously been issued to the website, but which are determined to be capable of potentially being issued to the website, with respect to the present embodiment.

In one embodiment, the weighted differences may take into account the severity of difference between the first HTTP response and the second HTTP response. In another embodiment, a severity of difference (e.g. a score) between the structure within first HTTP request and the structure within second HTTP request may be determined. In another embodiment, for each potential HTTP request, a severity of difference between such potential HTTP request and the first HTTP request may be determined and a severity of difference between such potential HTTP request and the second HTTP request may be determined. Such severity of differences may also be taken into account for determining the weighted differences.

As an option, the weighted differences may be determined utilizing a predetermined algorithm. Table 1 shows one example of an algorithm capable of being utilized to determine a component of a weighted difference for a potential HTTP request. It should be noted that such exemplary algorithm is set forth for illustrative purposes only, and thus should not be construed as limiting in any manner.

TABLE 1

$$C = D_{REQ-AB} \cdot \Sigma_{n=0}^{N} D_{RES-AB-n} \cdot (D_{RES-AC-n} + D_{RES-BC-n})$$

With respect to the algorithm in Table 1, 'C' is the component of the priority score for the potential HTTP request. $D_{REQ-AB}$ is the severity of difference (e.g. difference score) of response A (the first HTTP response) and response B (the second HTTP response). The summation in 'n' from 0 to 'N' is the summation of each leaf node in a request b-tree where 'n' is the index of the node and 'N' is the last node (e.g. see FIG. 8). $D_{RES-AB-n}$ is the severity of difference at node 'n' between request A (the first HTTP request) and request B (the second HTTP request). $D_{RES-AC-n}$ is the severity of difference at node 'n' between request A and request C (the potential HTTP request). $D_{RES-BC-n}$ is the severity of difference at node 'n' between requests B and C.

Using the given algorithm, a calculated component of a priority for the potential HTTP request accounts for the severity of difference in a response pair (response A and response B), the severity of difference for each structural location identified in the corresponding request pair (request A and request B), and the severity of difference in the structural locations identified between the each request in the pair (request A and request B) and the potential request (request C). To determine the priority of the potential HTTP request (request C), C is calculated for each possible response pair. The sum of all C's for a given potential request is the priority.

Moreover, the weighted differences are stored, as shown in operation 410. As an option, each weighted difference may be stored in association with an indication of the requests utilized to determine the weighted difference. Thus, each weighted difference may indicate the first request, the second request and the potential HTTP request utilized to determine the weighted difference.

Figure 5:
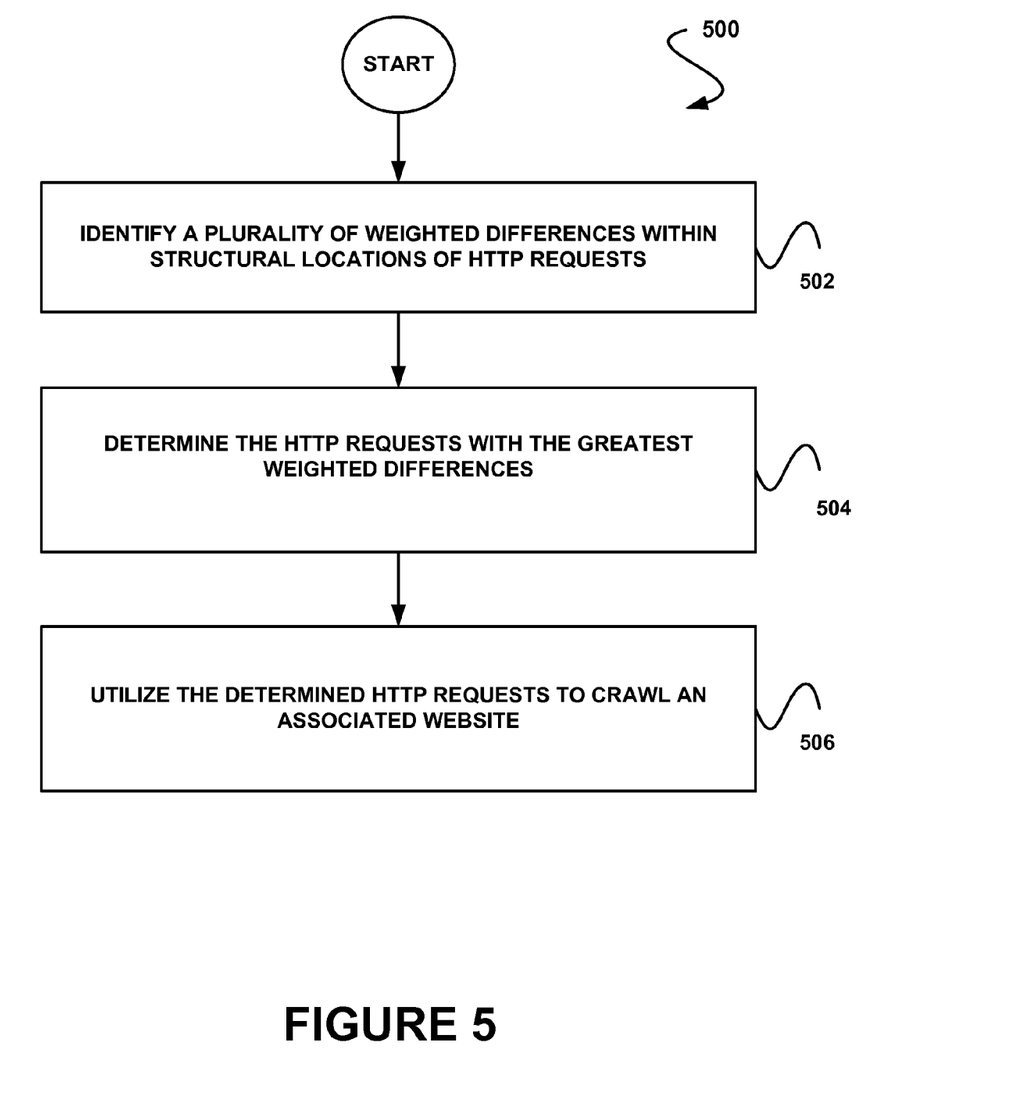
FIG. 5 shows a method for utilizing content requests with a greatest weighted difference to crawl a website, in accordance with yet another embodiment.

FIG. 5 shows a method 500 for utilizing content requests with a greatest weighted difference to crawl a website, in accordance with yet another embodiment. As an option, the method 500 may be carried out in the context of the architecture and environment of FIGS. 1-4. Of course, however, the method 500 may be carried out in any desired environment. It should also be noted that the aforementioned definitions may apply during the present description.

As shown in operation 502, a plurality of weighted differences within structural locations of HTTP requests is identified. With respect to the present embodiment, the weighted differences may each indicate a priority of an associated potential HTTP request. In one embodiment, the plurality of weighted differences may be identified from a storage location.

Additionally, the HTTP requests with the greatest weighted differences are determined. Note operation 504. Thus, the weighted differences may be compared for determining the greatest weighted differences and the HTTP requests associated therewith. As an option, a predetermined number of HTTP requests with the greatest weighted differences may be determined, such as only one HTTP request with the greatest weighted difference, the top 5 HTTP requests with the greatest weighted differences, etc.

Further, as shown in operation 506, the determined HTTP requests are utilized to crawl an associated website. The website may include a website for which the weighted differences were determined. For example, the weighted differences may take into account a severity of difference between a first request and a second request issued to the website, in addition to a severity of difference between a first response and a second response received from the website based on the first request and a second request.

As noted above, the determined HTTP requests may each include a potential HTTP request. Thus, the determined potential HTTP requests may be utilized for crawling the website. For example, the determined potential HTTP requests may be utilized for gathering content associated with the website.

Figure 6:
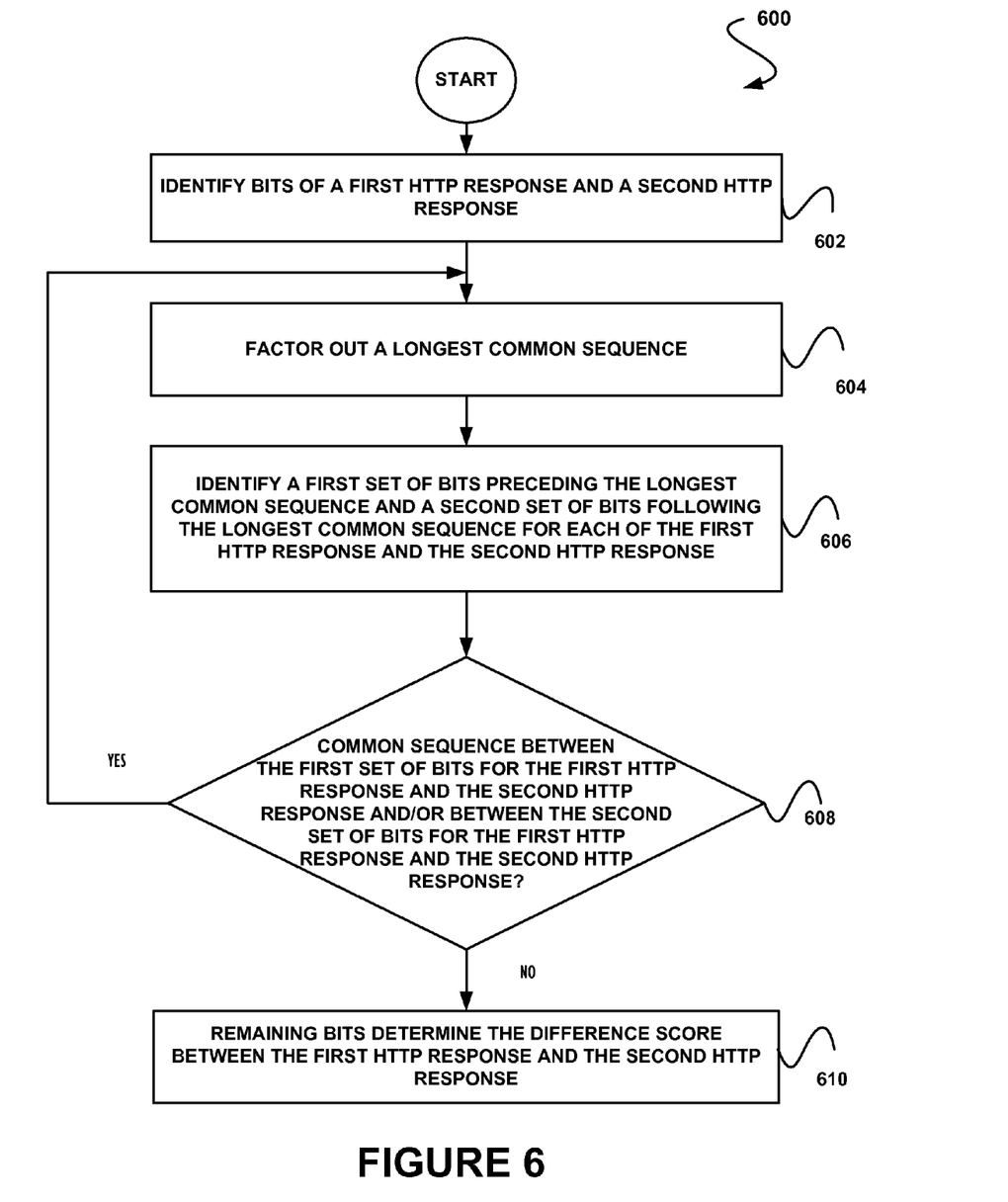
FIG. 6 shows a method for determining a difference score between responses to content requests, in accordance with still yet another embodiment.

FIG. 6 shows a method 600 for determining a difference score between responses to content requests, in accordance with still yet another embodiment. As an option, the method 600 may be carried out in the context of the architecture and environment of FIGS. 1-5. Of course, however, the method 600 may be carried out in any desired environment. Again, it should be noted that the aforementioned definitions may apply during the present description.

As shown in operation 602, bits of a first HTTP response and a second HTTP response are identified. The first HTTP response may include a response to a first HTTP request, and the second HTTP response may include a response to a second HTTP request. For example, the first HTTP request and the second HTTP request may be issued to a website, such that the first HTTP response and the second HTTP response may be received from the website. As an option, the first HTTP response and the second HTTP response may be stored for identifying the bits in memory.

In addition, as shown in operation 604, a longest common sequence between the first HTTP response and the second HTTP response is factored out. The longest common sequence may include any sequence of bits that is located in both the first HTTP response and the second HTTP response. With respect to the present embodiment, factoring out the longest common sequence may include removing the longest common sequence from each of the first HTTP response and the second HTTP response.

Further, a first set of bits preceding the longest common sequence and a second set of bits following the longest common sequence for each of the first HTTP response and the second HTTP response are identified. Note operation 606. The first set of bits of the first HTTP response may include an entire portion of the first HTTP response preceding the longest common sequence that was factored out of the first HTTP response. Similarly, the first set of bits of the second HTTP response may include an entire portion of the second HTTP response preceding the longest common sequence that was factored out of the second HTTP response.

The second set of bits of the first HTTP response may include an entire portion of the first HTTP response following the longest common sequence that was factored out of the first HTTP response. Additionally, the second set of bits of the second HTTP response may include an entire portion of the second HTTP response following the longest common sequence that was factored out of the second HTTP response.

Moreover, it is determined whether a common sequence exists between the first set of bits for the first HTTP response and the second HTTP response and/or the second set of bits for the first HTTP response and the second HTTP response. Note decision 608. Thus, the first set of bits for the first HTTP response and first set of bits for the second HTTP response may be compared. If it is determined that a common sequence exists between the first set of bits for the first HTTP response and first set of bits for the second HTTP response, a longest common sequence included in the first set of bits for the first HTTP response and first set of bits for the second HTTP response may be factored out (operation 604). In this way, the first set of bits for the first HTTP response and the second HTTP response may be recursively bisected by removing common sequences of bits therein, until a common sequence of bits not longer exists in the first set of bits for the first HTTP response and the second HTTP response.

If (or when) it is determined that a common sequence does not exist between the first set of bits for the first HTTP response and first set of bits for the second HTTP response, the second set of bits for the first HTTP response and second set of bits for the second HTTP response may be compared. If it is determined that a common sequence exists between the second set of bits for the first HTTP response and second set of bits for the second HTTP response, a longest common sequence included in the second set of bits for the first HTTP response and second set of bits for the second HTTP response may be factored out (operation 604). In this way, the second set of bits for the first HTTP response and the second HTTP response may be recursively bisected by removing common sequences of bits therein, until a common sequence of bits not longer exists in the second set of bits for the first HTTP response and the second HTTP response.

If (or when) it is determined that a common sequence of bits no longer exists in the first set of bits for the first HTTP response and the second HTTP response and that a common sequence of bits no longer exists in the second set of bits for the first HTTP response and the second HTTP response, remaining bits of the first HTTP response and the second HTTP response are utilized to determine the difference score between the first HTTP response and the second HTTP response. Note operation 610. For example, the difference score may indicate a number of remaining bits, and thus a number of different bits, between the first HTTP response and the second HTTP response. Accordingly, a difference between the first HTTP response and the second HTTP response may be determined.

FIG. 7 shows a b-tree 700 utilized for determining a difference between responses to content requests, in accordance with another embodiment. As an option, the b-tree 700 may be implemented in the context of the architecture and environment of FIGS. 1-3. Of course, however, the b-tree 700 may be implemented in any desired environment. Yet again, it should be noted that the aforementioned definitions may apply during the present description.

The b-tree 700 represents a recursive bisection of a first response and a second response. Thus, the b-tree 700 of the present embodiment may show a bitwise factoring of response A and response B described herein below by way of example. The nodes closest to the root represent the largest common factors between response A and response B. Leaves of the b-tree (i.e. nodes with no children) represent the bits of response A and response B that are not factored out, and thus the bits that are different among response A and response B.

With respect to the present embodiment, response A may include the content shown in Table 2 and response B may include the content shown in Table 3. It should be noted that the content shown in Tables 2 and 3 are set forth for illustrative purposes only, and thus should not be construed as limiting in any manner.

TABLE 2

HTTP/1.1 200 OK
Content-Length: 13
Content-Type: text
Hello, world.

TABLE 3

HTTP/1.1 404 Not Found
Content-Length: 15
Content-Type: text
Goodbye, world.

Table 4 shows the bits of response A and Table 5 shows the bits of response B, as decomposed in the b-tree 700. Again, it should be noted that the content shown in Tables 4 and 5 are set forth for illustrative purposes only, and thus should not be construed as limiting in any manner.

TABLE 4

01001000010101000101010001010000001011110011000100101110001100010
01000000011001000110000001100000010000001001111010010110000110100
00101001000011011011110110111001110100011001010110111001110100001
01101010011000110010101101110011001110111011000110100000111010010
00000011000100110011000011010000101001000011011011110110111001110
10001100101011011100111010000101101010101000111100101110000011001
01001110100010000011101000110010101111000011101000000011010000101
00000110100001010010010000110010101101100011011000110111100101100
001000000111011011011110110010011011000110010000101110

TABLE 5

01001000010101000101010001010000001011110011000100101110001100010
01000000110100001100000110100001000000100011001101111011110000
10000001000110011011110110101011011100110010000001101000001010010
0001101101111011011100110100001100101011011100110100001011010100
11000110010101101110011001110111010001101000011101000100000000110
00100110101000010100100001011011111011110110101111100111010000111001
01011011100111010000010110101010100011110010111000001100101011101
0001000001110100011001010111100001110100000001101000010100000110
00001010010001110110111101101111011001000110010011110010110010
01011000010000011101110110111101100100110110001100100001011110

With respect to response A and response B, the longest sequences of bits to be factored out of each response correspond to the textual strings "HTTP/1.1", "Content-Length:", "Content-Type: text", and ", world.". Thus, as shown in the b-tree 700, the nodes closest to the root represent the largest common factors of response A and response B (e.g. ", world"), whereas the leaves of the b-tree 700 (i.e. the nodes with no children) represent the bits that are uncommon with respect to response A and response B, upper regions of each of such leaves representing bits from response A and lower regions of each of such leaves representing bits from response B. As shown by the b-tree 700, there are 112 bits that are not held in common by responses A and B.

Figure 8:
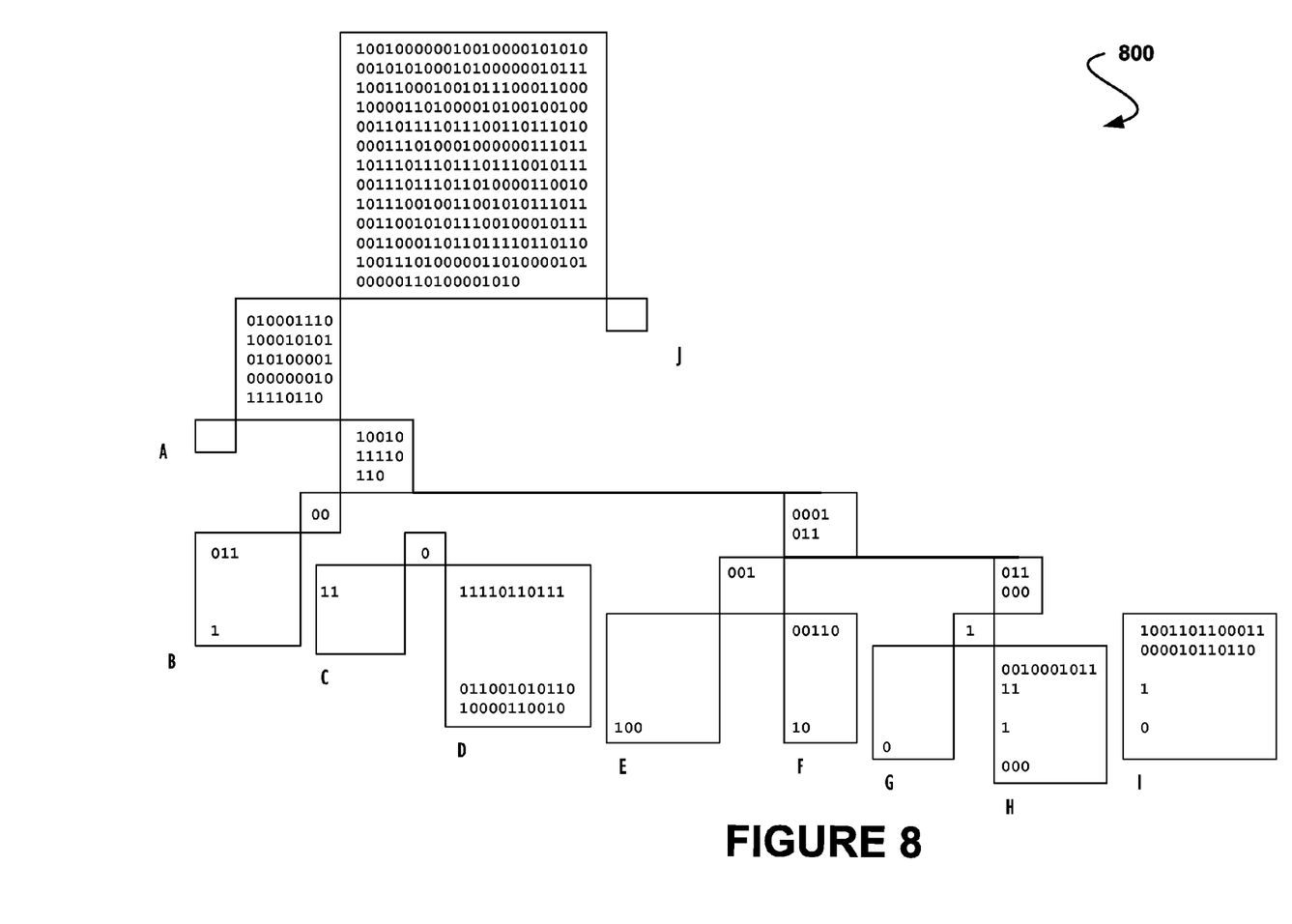
FIG. 8 shows a b-tree utilized for determining a difference between two issued content requests and a content request that may potentially be issued, in accordance with yet another embodiment.

FIG. 8 shows a b-tree 800 utilized for determining a difference between two issued content requests and a content request that may potentially be issued, in accordance with yet another embodiment. As an option, the b-tree 800 may be implemented in the context of the architecture and environment of FIGS. 1-3. Of course, however, the b-tree 800 may be implemented in any desired environment. It should also be noted that the aforementioned definitions may apply during the present description.

The b-tree 800 represents a recursive bisection of a first request, second request and a third potential request. Thus, the b-tree 700 of the present embodiment may show a bitwise factoring of request A (the issuance to a website which serves as the basis for the receipt of response A), request B (the issuance to the website which serves as the basis for the receipt of response B) and potential request C (not yet issued to the website) described herein below by way of example. The nodes closest to the root represent the largest common factors between request A, request B and potential request C. Leaves of the b-tree (i.e. nodes with no children) represent the bits of request A, request B and potential request C that are not factored out, and thus the bits that are different among request A, and request B and potential request C.

With respect to the present embodiment, request A may include the request shown in Table 6, request B may include the request shown in Table 7, and potential request C may include the request shown in Table 8. It should be noted that the content shown in Tables 6-8 are set forth for illustrative purposes only, and thus should not be construed as limiting in any manner.

TABLE 6

GET /foo/bar/blam HTTP/1.1
Host: www.wherever.com

TABLE 7

GET /a/b/c HTTP/1.1
Host: www.wherever.com

TABLE 8

GET /hehe/haha HTTP/1.1
Host: www.wherever.com

Table 9 shows the bits of request A, Table 10 shows the bits of request B, and Table 11 shows the bits of potential request C, as decomposed in the b-tree 800. Again, it should be noted that the content shown in Tables 9-11 are set forth for illustrative purposes only, and thus should not be construed as limiting in any manner.

TABLE 9

0100011101000101010101000010000000101111011001100110111101110
0101111011000100110000101110010001011110110001001101100011000101
10110100100000010010000101010001010100010100000101111001100001001
0111000110001000011010000101001001000011011110111001101110100011
101000010000011101110111011101110110010111001110110110100001100
1010111001001100101011101100110010101110010001011100110001101101
11011011010011101000001101000010100001101000101010

TABLE 10

01000111010001010101010000100000001011111011000010010111101100100
010111101100011001000001001000010101000101010001010000001011110
1100010010111001100110010011010000101000010010000101111011110011011
10100001110100010000011101110111011101110110010111001110111010110
1000011001010111001001100101011101100110010101110010001011100110011100
01101101111011011010011101000001101000010100001101000010100

TABLE 11

01000111010001010101010000100000001011111011010000110010101011010000
11001010010111011010000110000101010000100001001000000100100001
010100010101001010000010111100110001001011100110001000001101000
010100100100001101111011100110110111010000111010001000000111011101110
01110110111001011100111011101010000110010101110010010011001010111
0011001010110010001011100110001101101111011011010011101000001101000010100001101000010100
0100001010000110100001010

As shown in the b-tree 800, the nodes closest to the root represent the largest common factors of request A, request B, and potential request C, whereas the leaves of the b-tree 800 (i.e. the nodes with no children) represent the bits that are uncommon with respect to request A, request B, and potential request C, upper regions of each of such leaves representing bits from request A, middle regions representing bits from request B, and lower regions of each of such leaves representing bits from potential request C. Thus, the leaf nodes may contain up to 3 different sequences of uncommon bits, including those for request A, request B, and potential request C.

The leaf nodes of the b-tree 800 establish structural locations that vary between request A, request B, and potential request C. Each node is assigned a difference score for the sequences that correspond to the requests that have already been issued. This difference score determines the priority of the node.

With respect to the present b-tree 800, the difference scores between request A and request B for each node are as shown in Table 12. Again, it should be noted that the difference scores shown in Table 12 is set forth for illustrative purposes only, and thus should not be construed as limiting in any manner.

TABLE 12

| | |
|---|---|
| A. | 0 |
| B. | 3 |
| C. | 2 |
| D. | 11 |
| E. | 0 |
| F. | 5 |
| G. | 0 |
| H. | 11 |
| I. | 24 |
| J. | 0 |

In one embodiment, the algorithm shown in Table 1 may be utilized for determining the priority of each node. Thus, a calculated component of the priority accounts for the severity of difference in response A and response B, the severity of difference for each structural location in request A and request B, and the severity of difference in the structural locations between request A, request B, and potential request C.

With respect to the present embodiment, and just by way of example, C may be calculated utilizing the algorithm shown in Table 1 as shown in Table 13. Yet again, it should be noted that the calculation shown in Table 13 is set forth for illustrative purposes only, and thus should not be construed as limiting in any manner.

TABLE 13

$C = 112 \cdot (0 \cdot (0 + 0)$
$+3 \cdot (2 + 1)$
$+2 \cdot (2 + 0)$
$+11 \cdot (12 + 23)$
$+0 \cdot (3 + 3)$
$+5 \cdot (3 + 2)$
$+0 \cdot (1 + 1)$
$+11 \cdot (9 + 4)$
$+24 \cdot (24 + 2)$
$+0 \cdot (0 + 0))$
$\therefore C = 112 \cdot (0 + 9 + 4 + 385 + 0 + 25 + 0 + 143 + 624 + 0)$
$\therefore C = 112 \cdot 1190$
$\therefore C = 133280$ To determine the priority of potential request, C may be calculated for each possible pairings of responses received in response to issued requests (e.g. requests issued to the website for which the priority of potential request C is being determined). The sum of all Cs for a potential request C may thus be the priority of potential request C, and may be utilized for ordering potential request C among a plurality of other potential requests for which priorities have been determined.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A non-transitory computer readable medium comprising instructions stored thereon that when executed cause a web-crawling computer system to:
   determine by the web-crawling computer system a difference between a first content and a second content of a single website on a second computer system, the first content and second content identified in a first and second probe of the single website sent from the web-crawling computer system to the second computer system, each probe comprising a request and a corresponding response for information;
   identify by the web-crawling computer system a scheme of the single website based on the difference; and
   direct crawling by the web-crawling computer system of a portion of the single website on the second computer system, the directed crawling based on the identified scheme, and the directed crawling to further identify vulnerability to unwanted activity on the single website.

2. The non-transitory computer readable medium of claim 1, wherein the first content includes a first response to a first request and the second content includes a second response to a second request.

3. The non-transitory computer readable medium of claim 2, further comprising instructions to cause the web-crawling computer system to compare the first response and the second response to determine a severity of difference between the first response and the second response.

4. The non-transitory computer readable medium of claim 1, wherein the difference is represented by a score.

5. The non-transitory computer readable medium of claim 1, wherein the difference is determined utilizing a b-tree.

6. The non-transitory computer readable medium of claim 2, wherein the scheme is identified by instructions to cause the web-crawling computer system to process the first request, the second request, and a third request.

7. The non-transitory computer readable medium of claim 6, wherein the instructions to cause the web-crawling computer system to process the first and second requests take into account the difference between the first content and the second content.

8. The non-transitory computer readable medium of claim 6, wherein the instructions to cause the web-crawling computer system to process the first and second requests utilize a b-tree.

9. The non-transitory computer readable medium of claim 6, wherein the instructions to cause the web-crawling computer system to process the first request, the second request, and the third request determine a first score.

10. The non-transitory computer readable medium of claim 9, wherein the scheme is further identified by instructions to cause the web-crawling computer system to process the first request, the second request, and a fourth request.

11. The non-transitory computer readable medium of claim 10, wherein the instructions to cause the web-crawling computer system to process the first request, the second request, and the fourth request determine a second score.

12. The non-transitory computer readable medium of claim 11, further comprising instructions to cause the web-crawling computer system to compare the first score with the second score.

13. The non-transitory computer readable medium of claim 12, further comprising instructions to cause the web-crawling computer system to select only one of the third request and the fourth request to transmit to perform the directed crawling of the single website, based on the comparison.

14. The non-transitory computer readable medium of claim 2, wherein at least one of the first request, the second request, the first response, and the second response are compressed.

15. The non-transitory computer readable medium of claim 2, wherein the first request, the second request, the first response, and the second response comprise a full set of requests and responses, and wherein only a subset of the full set of requests and responses are stored.

16. The non-transitory computer readable medium of claim 2, wherein the first request, the second request, the first response, and the second response are processed utilizing multiple parallel threads.

17. The non-transitory computer readable medium of claim 1, wherein the instructions to cause the web-crawling computer system to direct crawling of the portion of the single website include instructions to cause the web-crawling computer system to perform the directed crawling for security purposes.

18. A method, comprising:
   determining, utilizing a hardware processor of a web-crawling computer system, a difference between a first content and a second content of a single website on a second computer system, the difference determined in part by first removing at least one common sequence from said first content and said second content, the first content and second content identified in a first and second probe of the single website sent by the web-crawling computer system to the second computer system, each probe comprising a request and a corresponding response for information;
   identifying, by the web-crawling computer system, a scheme of the single website based on the difference; and
   directing crawling by the web-crawling computer system, of a portion of the single website on the second computer system, the crawling directed based on the scheme, and the directed crawling to identify vulnerability to unwanted activity on the single website.

19. A non-transitory computer readable medium comprising instructions stored thereon that when executed cause a web-crawling computer system to:
   remove, by the web-crawling computer system, at least one common sequence from a first content and a second content of a single website on a second computer system, the first content and second content retrieved in response to a first and second probe of the single website sent by the web-crawling computer system to the second computer system, each probe comprising a request and a corresponding response for information;
   determine, by the web-crawling computer system, a difference between said first and second content after said at least one common sequence has been removed from said first and second content;
   identify, by the web-crawling computer system, a scheme of the single website based on the difference; and
   direct crawling, by the web-crawling computer system, of a portion of the single website on the second computer system, the directed crawling based on the scheme, and the directed crawling to identify vulnerability to unwanted activity on the single website.

20. The non-transitory computer readable medium of claim 19, further comprising instructions to cause the web-crawling computer system to:
   initiate a first HTTP response to a first request associated with said first content and a second HTTP response to a second request associated with said second content; and
   compare the first HTTP response and the second HTTP response to determine a severity of difference between the first HTTP response and the second HTTP response and to derive a score based on the severity of difference.

* * * * *